W. F. BOUCHÉ.
ELECTRIC GENERATOR.
APPLICATION FILED OCT. 30, 1918.
1,405,180.
Patented Jan. 31, 1922.
2 SHEETS—SHEET 1.
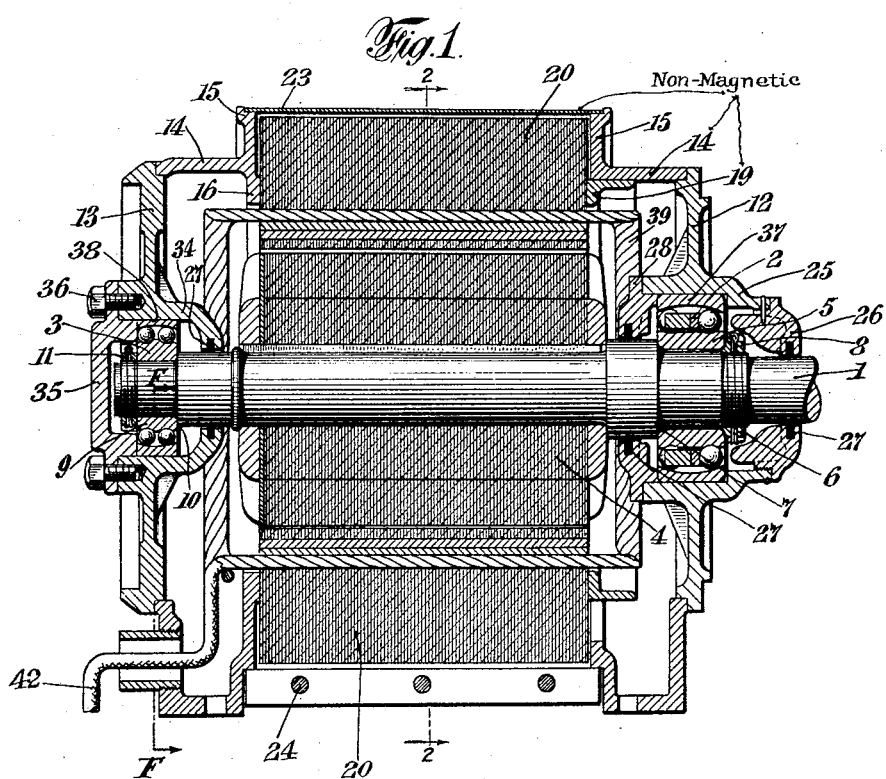

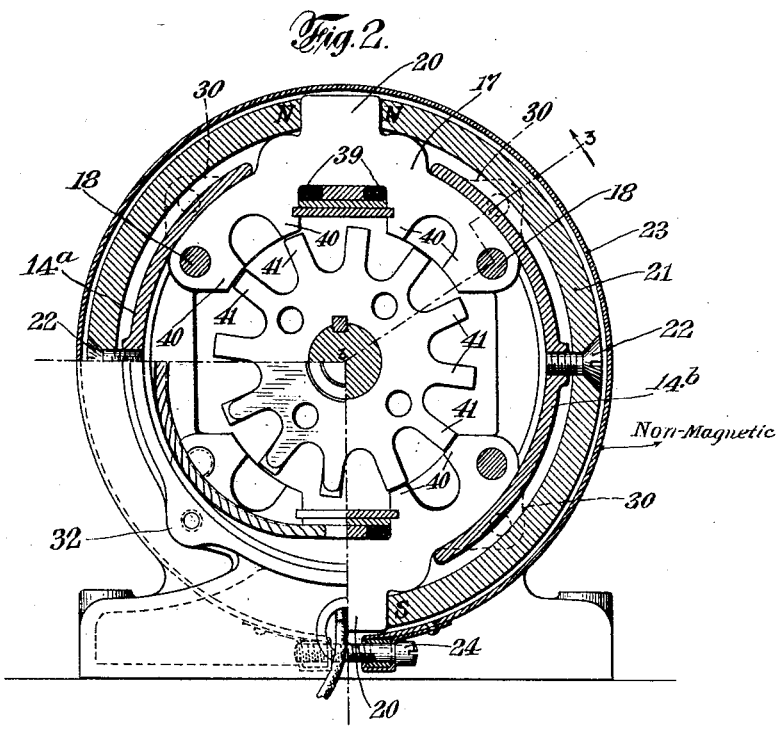
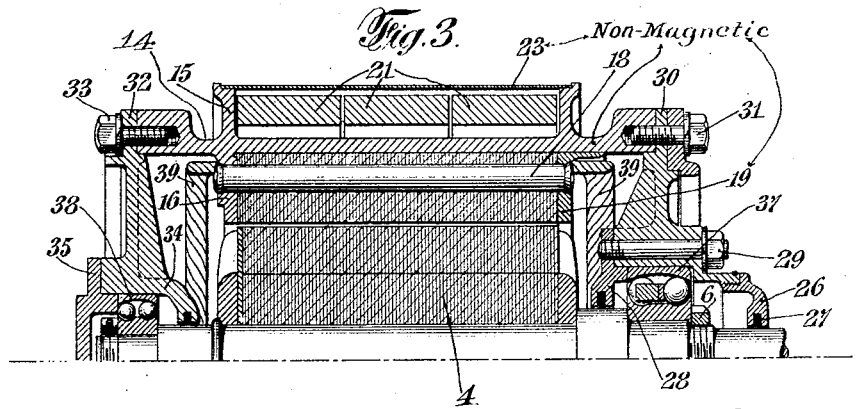

UNITED STATES PATENT OFFICE.

WILLIAM F. BOUCHÉ, OF LANCASTER, PENNSYLVANIA, ASSIGNOR TO GOULD COUPLER COMPANY, A CORPORATION OF NEW YORK.

ELECTRIC GENERATOR.

1,405,180.  Specification of Letters Patent.  Patented Jan. 31, 1922.

Application filed October 30, 1918. Serial No. 260,287.

*To all whom it may concern:*

Be it known that I, WILLIAM F. BOUCHÉ, a citizen of the United States, residing at Lancaster, county of Erie, State of New York, have invented certain new and useful Improvements in Electric Generators, of which the following is a specification.

My invention relates to electric generators, and particularly to magnetos of the inductor type.

My object in designing this apparatus was to so construct the same as to secure the maximum efficiency of the various magnetic forces, and also to simplify the construction of machines of this kind.

A machine embodying my invention is illustrated in the accompanying drawings in which—

Fig. 1 represents a central section;

Fig. 2 is a three-quarter section on line 2—2 of Fig. 1 and a quarter section on line F—F of Fig. 1; and Fig. 3 shows a section on line 3—3 of Fig. 2.

Referring to the drawings, it will be seen that shaft 1 is mounted in bearings 2 and 3. Keyed to the shaft 1 is a rotor 4 of the generator. The bearings for the shaft 1 may be of any well known construction and, as shown, are ball-bearings. One part 5 of the bearing 2 is placed on the shaft 1 and a ring 6 is screwed on the shaft, which is threaded, so as to force part 5 firmly against the shoulder 7 on the shaft. The ring 6 is held in place by a cotter-pin 8 or other suitable means. The other bearing 3 has a similar part 9 on the shaft 1, and this part 9 is held in place against the shoulder 10 by a ring member 11 similar to the ring 6.

The other part of each of the bearings is supported by frame members 12 and 13, which members also constitute the ends of the generator. Attached to the ends 12 and 13 is a cylindrical body member 14. This member, is made of non-magnetic material. The member 14 has near its ends two integral upstanding flanges 15 and directly underneath the upstanding flange at one end is a flange 16 extending inwardly. Mounted in the member 14 are two pole pieces 17. The pole pieces are made up in the usual manner from steel laminations. Each of the poles is held in place by two rods 18 extending therethrough. One end of each of the rods passes through the inwardly extending flange 16 and the other passes through a non-magnetic ring 19 which is similar in shape to the flange 16 and which ring is pressed in place snugly inside the member 14 after the laminations have been put in position. The ends of the rods are riveted so as to securely hold them in place. Each of the poles 17 has a projection 20 which extends out through an elongated opening in the member 14. The projections extend outwardly substantially to the periphery of the upstanding flanges 15. In the machine illustrated the projections are diametrically opposite each other and their sides being straight are substantially parallel to each other and their ends are substantially in the same plane.

Permanent magnets 21 are placed outside the member 14 and within the periphery of the upstanding flanges 15 and with their ends firmly against the projections 20 of the poles. These magnets are also attached to the member 14 preferably at their middle point by means of screws 22. Intermediate its ends the member 14 is slotted so as to permit the poles to project through them thus forming two substantially semi-cylindrical portions $14^a$ and $14^b$ to which the magnets are fastened by the screws 22. The screws are counter-sunk and the parts are so arranged that when the ends of the magnets engage the pole projections, there is a slight space between the member 14 and the middle part of the magnets so that in tightening the screws 22 the magnets are placed under compression, thereby firmly pressing their ends against the pole projections. In the machine illustrated there are three magnets on each side of the machine, making six altogether. These magnets are arranged against the pole projections 20 in such a manner that the north poles of both sets of magnets rest against the same projection, and the south poles of both sets of magnets rest against the same projection. Obviously the number of magnets in each set may be changed as well as the number of sets so as to provide the required number of poles, if more than two poles are desired. Surrounding the magnets and bearing against the upturned flanges is placed a member 23 of any suitable non-magnetic and preferably non-corrosive metal, the ends of which are held together by means of bolts 24, as shown in Fig. 2.

The end member 12 has an outwardly extending integral flange 25 which is threaded. A ring 26 is screwed into this flange and has an oil packing 27 therein bearing against the shaft 1. There is a similar ring 28 secured to a similar flange on the member 12 by bolts 29 (see Fig. 3). The ring 28 also carries an oil packing 27. The end member 12 has four projections 30, preferably at 90° apart, which engage the body member 14 of the generator frame, as shown in Fig. 3. The projections 30 are fastened to the member 14 by means of bolts 31. The other end member 13 of the generator has similar projections 32 which are fastened to the member 14 by means of bolts 33.

The end member 13 has a flange 34, which is provided with an oil packing 27 and which contacts with the shaft 1. This member is also provided with a bearing housing end cap 35, which is held in place thereon by means of bolts 36. The other member 37 of the ball-bearing 2 is carried by the end member 12, as shown in Figs. 1 and 3. Likewise the other member 38 of the bearing 3 is carried by the member 13.

The pole pieces 17 are provided with a slot in which the coils 39 are placed. The poles are also provided with teeth 40. The rotor 4 is also provided with teeth 41, and the ends of the rotor teeth and the ends of the stator or pole teeth are cut concentrically with the center of the shaft 1, so that upon rotation, the ends of these teeth are placed in very close relation. The pitch of the rotor teeth is the same as the pitch of the stator teeth, but the teeth on the opposite sides of the poles are separated from each other a distance equal to an odd multiple of one half the pole tooth pitch, so that when the rotor teeth are aligned with the pole teeth on one side of the pole, the teeth of the rotor will be midway between the teeth on the other side of the same pole, as clearly shown in Fig. 2. The object of this arrangement is to produce a maximum flux change in the coils 39 with a minimum rotation of the rotor, the flux changing from maximum to minimum with a rotation equal to a movement of the rotor through a half tooth pitch.

The coils lying in the slots in the poles are connected in series and the terminals for these coils are led into the machine through an opening in which is placed a conduit 42, as shown in Fig. 1.

Having described my invention, what I claim as new and desire to secure by Letters Patent is:

1. In a magnetic machine, the combination of a non-magnetic frame having two substantially semicylindrical portions, laminated pole pieces inside said portions, a rod extending through said laminations to hold them in place, a non-magnetic ring fitting within said portions and in which one end of said rods is fastened, projections on said poles extending outwardly through said frame portions, and two sets of permanent magnets with like poles engaging each pole projection.

2. In a magnetic machine, the combination of a non-magnetic frame having two substantially semicylindrical portions, laminated pole pieces, a projection on each pole piece extending out beyond said portions, and two sets of permanent magnets having ends of like polarity engaging each of said projection.

3. In a magnetic machine, the combination of a non-magnetic frame having two substantially semicylindrical portions, laminated pole pieces, a projection on each pole piece extending out beyond said portions, two sets of permanent magnets having ends of like polarity engaging each said projection and means connecting said magnets to said portions.

4. In a magnetic machine, the combination of two substantially semicylindrical members with an integral upstanding flange at the ends thereof, a flange extending inwardly therefrom near one end, laminated pole pieces inside said members, a ring inside said members and holding said laminations in place, rods passing through said laminations and held at one end by the inward flange and at the other by said ring, a projection on each pole extending outwardly substantially to the edge of said upstanding flanges, two permanent magnets outside said members and having ends of the same polarity against said projections and means securing said magnets to said members.

5. In a magnetic machine, the combination of two poles of magnetic material, projections on said poles, permanent magnets engaging said projections and held against said poles by means applied near the center of said magnets, said projections and magnets being so arranged that the ends of the magnets lie substantially in the same plane.

6. In a magnetic machine, the combination of a substantially cylindrical member having openings dividing same into two substantially equal parts and means for supporting said member at its ends, an integral flange extending inwardly at one end of said member and a detachable ring at the other end and similar in shape to said flange, laminated pole pieces held in said member by rods passing therethrough and supported at one end in said flange and at the other end in said ring, permanent magnets bearing against said pole pieces, and means engaging substantially the middle of said magnets and said frame parts for holding the magnets in place against said poles.

7. In a magnetic machine the combination of a frame structure, two substantially semi-cylindrical permanent magnets oppositely disposed to form a substantially cylindrical structure, pole structures engaged by the ends of said permanent magnets respectively and means cooperating with the frame and acting on said permanent magnets centrally thereof, to force the ends of the magnets firmly against said pole structures.

8. In a magnetic machine the combination of a frame structure, a rotor operatively associated therewith, two permanent magnets oppositely disposed to substantially surround said rotor, pole structures engaged by the ends of said permanent magnets respectively and means cooperating with said frame and acting on said permanent magnets centrally thereof to force the ends of the magnets firmly against said pole structures.

In testimony whereof, I have signed my name to this specification.

WILLIAM F. BOUCHÉ.